Oct. 12, 1937.  R. W. LEUTWILER ET AL  2,095,506
AIR VENTING VALVE FOR STEAM APPLIANCES
Filed May 27, 1935

Inventors
Richard W. Leutwiler
+ William Eichholz
by Rummler Rummler & Woodworth
their Attys.

Patented Oct. 12, 1937

2,095,506

UNITED STATES PATENT OFFICE 2,095,506

AIR-VENTING VALVE FOR STEAM APPLIANCES

Richard W. Leutwiler and William Eichholz, Chicago, Ill., assignors to The Illinois Engineering Company, Chicago, Ill., a corporation of Illinois Application May 27, 1935, Serial No. 23,652

1 Claim. (Cl. 236—64)

This invention relates to temperature-responsive venting devices operable by the expansion and contraction of a fluid sealed therein.

An object of the invention is to provide an automatic device for venting air or other non-condensable gases from steam appliances, and for taking the place of pet-cocks or other vent means on steam traps.

It is also the purpose of the invention to provide a device of this character operable by the expansion and contraction of the fluid therein which is suitable for use in connection with high temperature steam in that it does not require the use of solder for sealing a flexible metal diaphragm.

A further purpose of the invention is to reduce the number of parts and simplify the construction of thermostatic devices used for venting air or controlling the flow of other fluids according to the temperature; and to make a construction not requiring the use of a sealing medium such as solder which is subject to softening or melting from the heat of high temperature steam.

The purposes of the invention are accomplished by means of a construction as illustrated in the drawing, wherein.

Figure 2:
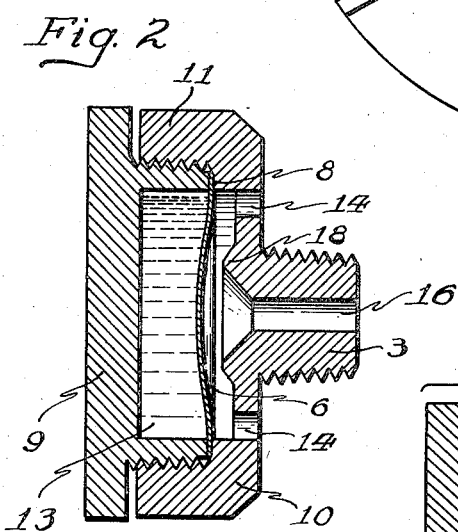
Fig. 2 is a longitudinal sectional view of the air vent.

The improved construction consists of few parts, the essentials of which, as shown in Fig. 2, are a diaphragm and two clamping members between which the diaphragm is located. One of these clamping members is hollowed out to receive a fluid which is readily responsive to materially expand or contract at some predetermined temperature.

The other clamping member has an internal protuberance which is hollow and communicates with a hollow externally threaded shank.

The inner protuberance provides a ring-shaped valve seat for the flexible disc or diaphragm, or a valve attached thereto.

The valve seat carrying part of the construction has openings to permit the flow thereinto of air or other fluid and out through the hollow shank, depending upon the position of the diaphragm valve. The device is intended for location upon the inside or outside of a steam trap, radiator or other steam appliance and to vent air or other fluid outwardly from such appliance.

Figure 1:
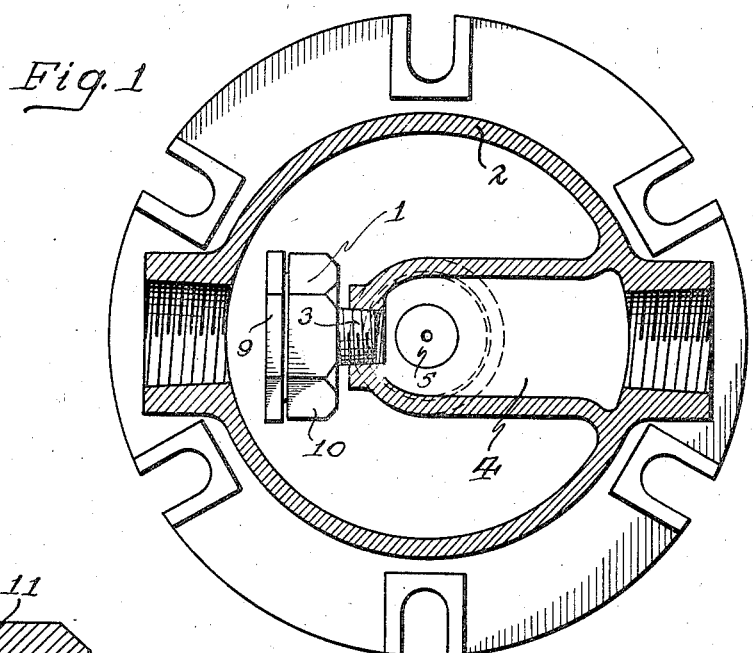
Figure 1 shows a steam trap in horizontal section and having applied thereto the improved venting device.

As illustrated in the drawing, the improved thermostatic device 1 is indicated in Figure 1 as on the inside of the casing 2 of a steam trap. The hollow threaded shank or nipple 3 of the thermostat passes through the wall of a discharge passageway 4. In this connection the function of the thermostat is to release air from the trap independently of the float or other water discharge controller which releases water from the trap through the conduit 5 leading to the passageway 4.

Figure 3:
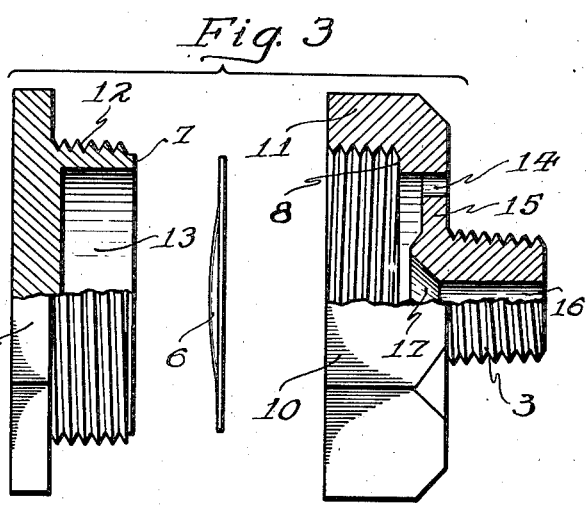
Fig. 3 is a side view, partly in section, of the disassembled elements of the construction.

The construction of thermostatic device 1 is shown by Figures 2 and 3. It consists of a flexible metallic disc 6 which is clamped between the ground edges of annular flanges or shoulders 7 and 8 respectively formed on the inner faces of members 9 and 10 each of which exteriorly are of hexagonal or other prismatic form to facilitate the application of wrenches thereto.

The members 9 and 10 should tightly fit together for the purpose of clamping the diaphragm around its periphery. This may be done by means of a pressed fit between the two members or as shown in the drawing, the peripheral flange 11 of the member 10 is internally threaded to engage the thread 12 cut on the outside of flange 7 of member 9. The space 13 between diaphragm 6 and the member 9 is completely closed by this member and the diaphragm and contains a more or less volatile fluid, which is responsive to temperature changes, for flexing the diaphragm.

The member 10 has perforations 14 in the web 15 thereof to allow for the inflow of air or other fluid under control of the device to an outlet passageway 16. A ring-shaped valve seat 18 for the diaphragm 6 is formed on an annular protuberance surrounding the flared end 17 of the bore or passageway 16 which extends through the threaded shank 3 extending outwardly from the member 10.

In assembling the construction, the space 13 in member 9 is partly filled with a temperature responsive liquid and is covered with the diaphragm 6 which is then clamped and tightly sealed against the shoulder 7 by screwing the member 10 onto the member 9.

The device is intended for use in a confined space on a steam appliance but to communicate to the exterior of said steam appliance through the passageway 16. It may be applied by engaging the threaded shank 3 with the wall, Figure 1, forming outlet passageway 4.

Figure 4:
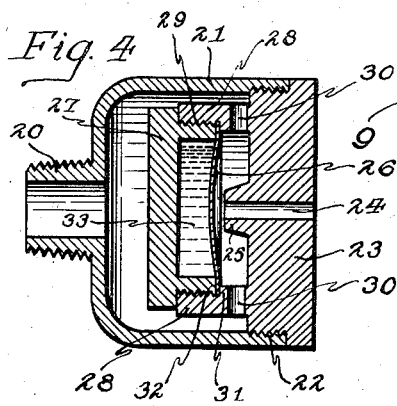
Fig. 4 shows a slightly modified construction which is used for attachment to the outside of a steam appliance.

Fig. 4 shows a rearrangement of the venting device for attachment to the outside of the steam appliance by means of the hollow threaded shank 20. This shank is integral with a cup-shaped casing 21 which is internally threaded at 22 to receive a plug 23. The plug has the central outlet aperture 24 which at its inner end is surrounded by a conical seat 25 for the diaphragm 26. The diaphragm is clamped around its periphery between the member 23 and the expansion fluid containing cup-shaped element 27 firmly fitting the flange 28 of the plug 23 and shown as having threaded engagement 29 therewith.

The diaphragm 26 is engaged between the annular shoulders 32 and 31. The flange 28 is provided with perforations 30. The air or gas which is vented by the device flows inwardly through the threaded boss 20 and through the perforations 30 to the outlet 24, except when the diaphragm 26 engages seat 25 due to the expansion of fluid within the space 33.

In the operation of the device as shown by Figs. 1, 2, and 3, the diaphragm 6 is normally clear of seat 17 and thus allows the escape of air from the trap. The trap, therefore, does not fail to function in the intended manner because of the presence of a pocket of air therein. Upon a rising temperature, such as caused by the entrance of steam into the trap, the expansion of the fluid in chamber 13 causes the diaphragm to seat against the ring 17 and close the outlet passageway 16.

The construction is safe to use in connection with high temperature steam. No solder joints are required therein.

We claim:

An air release valve for steam appliances, comprising a threaded nipple having a bore, an enlarged head at one end of said nipple being externally prismatic and being counter-bored and threaded to receive a plug, a plug threaded into said counterbore and having a cavity for expansible fluid, a diaphragm spanning and closing said cavity, said head having a shoulder coacting with said plug to clamp the peripheral margin of said diaphragm, and a projecting annular seat of substantially larger diameter than said nipple bore and spaced from said shoulder to cooperate with said diaphragm to thermostatically open and close said bore.

RICHARD W. LEUTWILER.
WILLIAM EICHHOLZ.